United States Patent
Kozik

[11] Patent Number: 6,026,841
[45] Date of Patent: Feb. 22, 2000

[54] PRESSURIZED FLUID APPARATUS

[76] Inventor: Meir Kozik, 58 Etzel St., 46750, Herzliya, Israel

[21] Appl. No.: 09/148,578

[22] Filed: Sep. 4, 1998

[30] Foreign Application Priority Data

Sep. 8, 1997 [IL] Israel ........................................ 121723
Jul. 23, 1998 [IL] Israel ........................................ 125499

[51] Int. Cl.⁷ ............................. F16K 31/26; F16K 43/00
[52] U.S. Cl. ........................... 137/202; 137/315; 137/444; 137/446; 141/59; 141/198
[58] Field of Search ................... 137/446, 444, 137/442, 315, 513.5, 413, 202, 397; 141/59, 198

[56] References Cited

U.S. PATENT DOCUMENTS

| | | | |
|---|---|---|---|
| 453,069 | 5/1891 | Vosburgh | 137/442 |
| 459,044 | 9/1891 | Moore | 137/446 |
| 674,276 | 5/1901 | Moore | 137/443 |
| 767,848 | 8/1904 | Stillman | 137/446 |
| 1,137,214 | 4/1915 | Kelley | 137/443 |
| 2,504,638 | 4/1950 | Browning | 137/446 |
| 4,142,552 | 3/1979 | Brown et al. | 137/446 |
| 4,294,288 | 10/1981 | Murthy | 137/397 |
| 4,483,367 | 11/1984 | Ross, Jr. et al. | 137/446 |
| 5,005,613 | 4/1991 | Stanley | 141/59 |
| 5,007,450 | 4/1991 | Babb et al. | 137/315 |
| 5,207,241 | 5/1993 | Babb | 137/315 |
| 5,234,019 | 8/1993 | Forner | 137/410 |
| 5,282,496 | 2/1994 | Kerger | 137/446 |
| 5,485,865 | 1/1996 | Shirk | 137/202 |
| 5,487,404 | 1/1996 | Kerger | 137/446 |
| 5,522,415 | 6/1996 | Hopenfeld | 137/15 |
| 5,531,247 | 7/1996 | Borst et al. | 141/198 |

FOREIGN PATENT DOCUMENTS

| | | | |
|---|---|---|---|
| 11554 | 2/1928 | Australia | 137/442 |
| 112616 | 12/1944 | Denmark | 137/442 |
| 1142736 | 12/1963 | Germany | 137/446 |
| 117543 | 3/1996 | Israel . | |
| 605477 | 3/1959 | Italy | 137/446 |

Primary Examiner—George L. Walton
Attorney, Agent, or Firm—Abelman, Frayne & Schwab

[57] ABSTRACT

Pressurized fluid apparatus including a pressurized fluid container, a pipe arranged for flow therethrough of the pressurized fluid into the container, a valve operatively connected to an end of the pipe disposed in the container, and a float attached to the valve, wherein the float is buoyed generally upwards by the pressurized fluid filling the container, such that when the float has been moved a predetermined amount, the float closes the valve and substantially stops flow of the pressurized fluid into the container, and wherein the float is insertable through an upper opening of the container, and wherein the valve is rotatably attached to the pipe, the valve being closed by an angular upward movement of the float, characterized by the valve including a tube with a longitudinal bore having a longitudinal axis formed therein, and a piston slidingly disposed in the tube, wherein only when the float is generally perpendicular to the longitudinal axis, the piston sealingly abuts an internal end face of the tube, thereby closing the valve.

9 Claims, 8 Drawing Sheets

6,026,841

PRESSURIZED FLUID APPARATUS

The present invention relates to apparatus and methods for filling pressurized fluid containers.

BACKGROUND OF THE INVENTION

Pressurized fluid containers, such as pressurized LPG containers, are typically filled by transferring therein a fluid at high pressure from a pressurized fluid source, such as a tanker truck. The container is generally designed in the art such that when it has been filled to approximately 80% of its total volume, fluid begins to escape through a relief valve, thereby signaling that the container has been adequately filled and that the filling operation should be terminated.

Some municipal codes forbid allowing fluid, such as LPG, from escaping to the environment to signal the end of the filling process. Therefore, it is desirable to provide apparatus and methods for filling pressurized fluid containers without any fluid escaping to the environment.

SUMMARY OF THE INVENTION

The present invention seeks to provide improved apparatus and methods for filling pressurized fluid containers without any fluid escaping to the environment.

There is thus provided in accordance with a preferred embodiment of the present invention pressurized fluid apparatus including, a pressurized fluid container, a pipe arranged for flow therethrough of the pressurized fluid into the container, a valve operatively connected to an end of the pipe disposed in the container, and a float attached to the valve, wherein the float is buoyed generally upwards by the pressurized fluid filling, the container, such that when the float has been moved a predetermined amount, the float closes the valve and substantially stops flow of the pressurized fluid into the container, and wherein the float is insertable through an upper opening of the container, and wherein the valve is rotatably attached to the pipe, the valve being closed by an angular upward movement of the float, characterized by the valve including a tube with a longitudinal bore having, a longitudinal axis formed therein, and a piston slidingly disposed in the tube, wherein only when the float is generally perpendicular to the longitudinal axis, the piston sealingly abuts an internal end face of the tube, thereby closing, the valve.

In accordance with a preferred embodiment of the present invention the piston has an enlarged end and the bore has an enlarged portion to accommodate and receive therein the enlarged end, and wherein movement of the enlarged end along, the longitudinal axis of the tube is constrained between a shoulder and an end surface of the enlarged portion of the bore.

Further in accordance with a preferred embodiment of the present invention interface member extends from the piston and protrudes through an aperture formed in the tube, and the float is mounted on a float arm, and wherein an end of the float arm has a generally flat end portion which initially abuts against the interface member and a generally arcuate portion which initially contacts a low-friction portion of the interface member, and wherein the piston sealingly abuts the internal end face of the tube only when the arcuate portion slides off the low-friction portion.

Still further in accordance with a preferred embodiment of the present invention an interface member extends from the piston and protrudes through an aperture formed in the tube, and the float is mounted on a float arm, and wherein an end of the float arm has a generally flat end portion which initially abuts against the interface member and a generally arcuate portion which initially contacts a low-friction portion of the interface member, and wherein the piston sealingly abuts the internal end face of the tube only when the flat end portion is rotated about 90° from the interface member.

Additionally in accordance with a preferred embodiment of the present invention the piston is shaped to ensure laminar flow of a pressurized fluid therearound.

Preferably a bypass passageway is provided for conducting therethrough fluid, even during filling, of the container.

It is a particular feature of the present invention that the valve when closed, is preferably not hermetically closed, but rather a small amount of fluid is purposely allowed to leak into the container. The small leakage ensures that no damage will occur to the pipe due to pressure build-up.

In accordance with a preferred embodiment of the present invention a biasing device imparts a biasing force on the piston, the biasing, force being, of a magnitude such that if the tube contains a predetermined amount of the pressurized fluid then the predetermined amount is sufficient to overcome the biasing force and seat the piston against the internal end face, and that if the tube contains less than the predetermined amount, the biasing, device urges the piston away from the internal end face of the tube. Preferably the biasing device is disposed in a bore formed in the piston.

Additionally in accordance with a preferred embodiment of the present invention a needle hole is formed in a wall of the float, the hole being sufficiently small such that generally only vapors of the pressurized fluid and not liquid of the pressurized fluid can enter the float.

BRIEF DESCRIPTION OF THE DRAWINGS

The present invention will be understood and appreciated more fully from the following detailed description, taken in conjunction with the drawings in which.

DETAILED DESCRIPTION OF A PREFERRED EMBODIMENT

Figure 1:
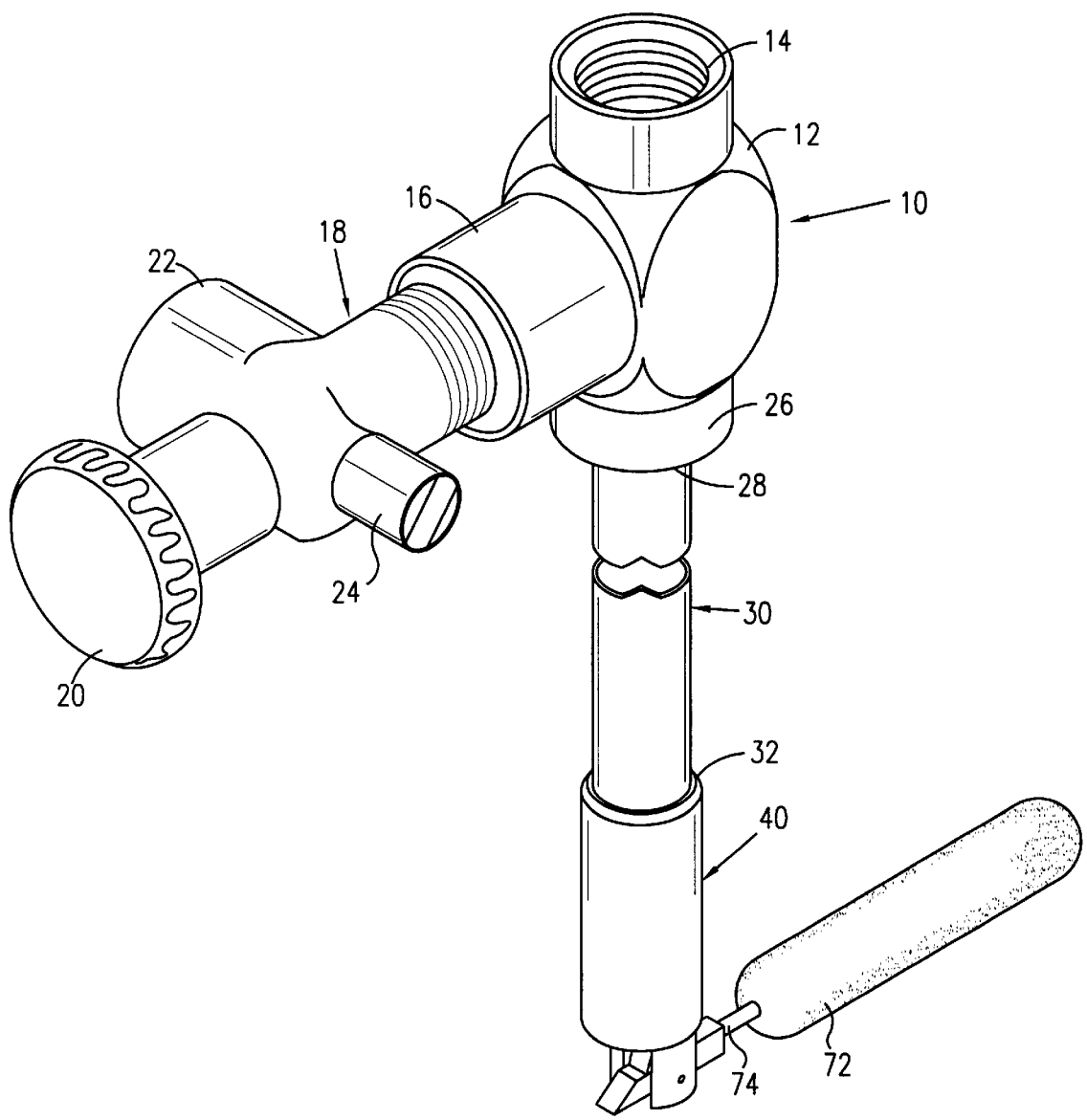
FIG 1. is a simplified pictorial illustration of filling apparatus constructed and operative in accordance with a preferred embodiment of the present invention.

Reference is now made to FIG. 1 which illustrates filling apparatus 10, constructed and operative in accordance with a preferred embodiment of the present invention.

Filling apparatus 10 preferably includes a tee 12 which includes a first threaded branch 14 for attachment thereto to a source of pressurized fluid (not shown), such as pressurized LPG. A second threaded branch 16 is preferably attached to a consumer valve 18. Valve 18 preferably includes a handle 20 for closing/opening thereof, a threaded coupling 22 for attachment thereto a consumer fluid supply line (not shown), and a relief valve 24. A third threaded branch 26 of tee 12 is preferably attached to an upper end 28 of a pipe 30. A lower end 32 of pipe 30 is preferably attached to and in fluid communication with a valve 40.

Figure 2:
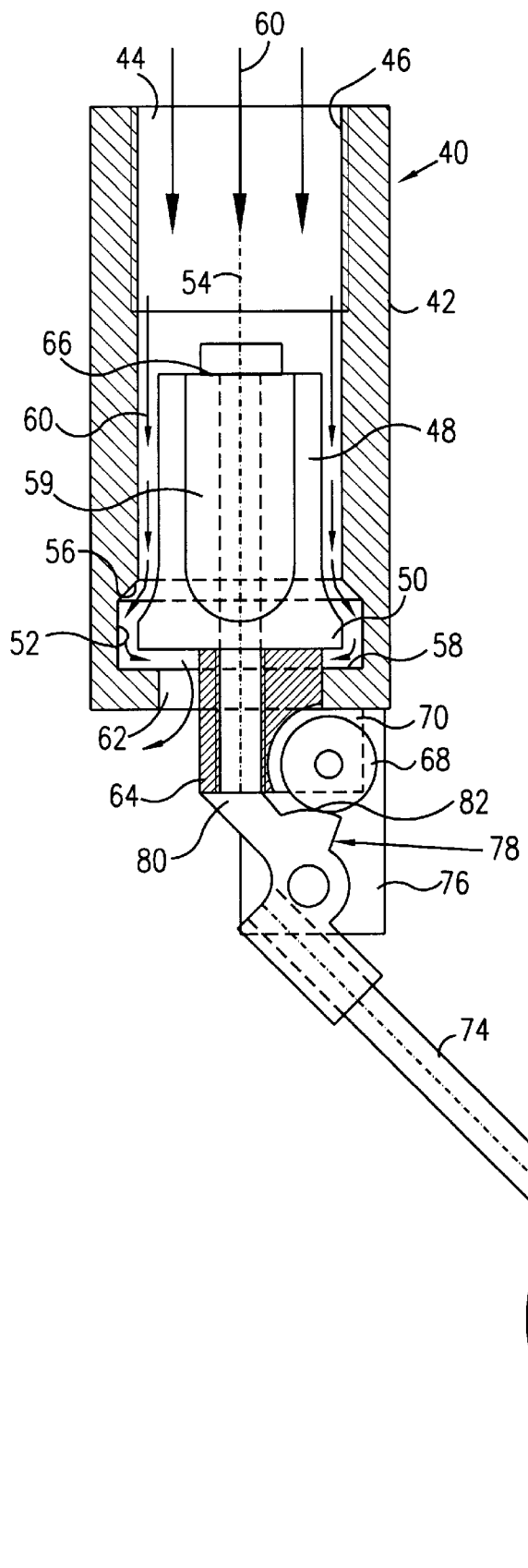
FIG. 2 is a simplified, partially sectional illustration of a valve of the filling apparatus of FIG. 1, constructed and operative in accordance with a preferred embodiment of the present invention, in an open position.

Reference is now made to FIG. 2 which illustrates valve 40, constructed and operative in accordance with a preferred embodiment of the present invention, in an open position. Valve 40 includes a tube 42 with a longitudinal bore 44 formed therein. Bore 44 has a threaded end 46 which is threadably connected to lower end 32 of pipe 30 (FIG. 1). A piston 48 is slidingly disposed in tube 42. Piston 48 is preferably generally cylindrical in shape and has an enlarged end 50. Bore 44 has an enlarged portion 52 to accommodate and receive therein enlarged end 50. It is seen in FIG. 2 that movement of enlarged end 50 along a longitudinal axis 54 of tube 42 is constrained between a shoulder 56 and an end surface 58 of enlarged portion 52. Piston 48 may be fluted or otherwise suitably shaped along the non-enlarged portion, indicated by reference numeral 59, to ensure laminar flow of a pressurized fluid 60 therearound and to minimize pressure drop of the flow.

Extending from enlarged end 50 and protruding through an aperture 62 formed in tube 42 is an interface member 64. Interface member 64 may be constructed integrally as one piece with piston 48, or alternatively may be attached to piston 48 by means of a screw 66. A roller 68 may be rotatably attached to a portion 70 of interface member 64 offset from axis 54.

A float 72 is mounted on a float arm 74 which is pivotally attached to a block 76 fixedly attached to tube 42. An end 78 of float arm 74 has a generally flat end portion 80 which initially abuts against interface member 64 and a generally arcuate portion 82 which initially contacts roller 68. In the position of FIG. 2, enlarged end 50 of piston 48 does not initially rest against end surface 58, and pressurized fluid 60 is free to flow through aperture 62 into a pressurized container (not shown in FIG. 2).

Figure 3:
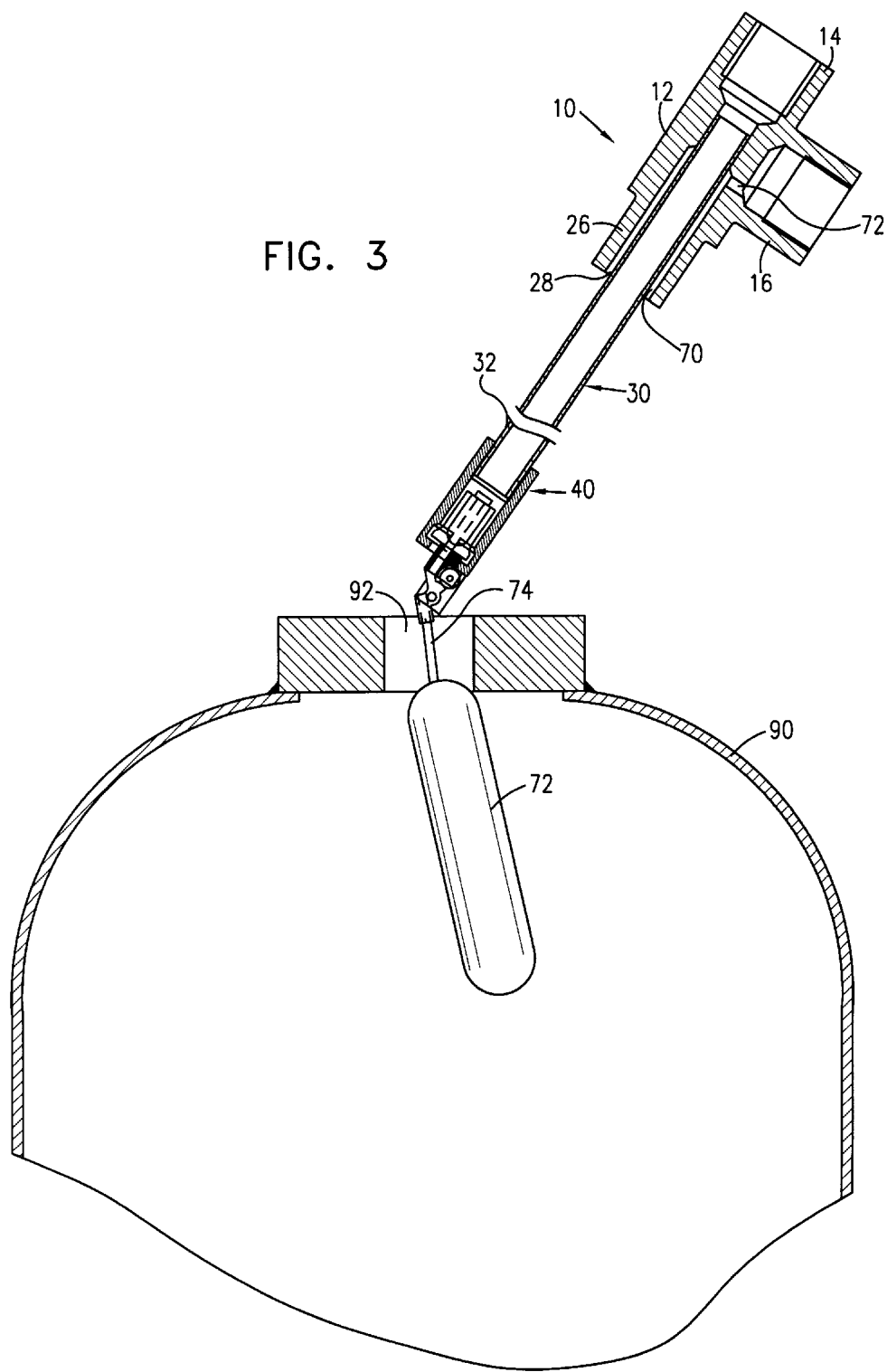
FIG. 3 is a simplified, partially sectional illustration of inserting the filling apparatus of FIG. 1 into a pressurized fluid container.

Reference is now made to FIG. 3 which illustrates inserting filling apparatus 10 into a pressurized fluid container 90. Consumer valve 18 has been omitted for clarity. It is seen that float 72 may be conveniently rotated relative to pipe 30 so as to permit insertion of filling, apparatus 10 through a neck 92 of pressurized fluid container 90.

Figure 4A:
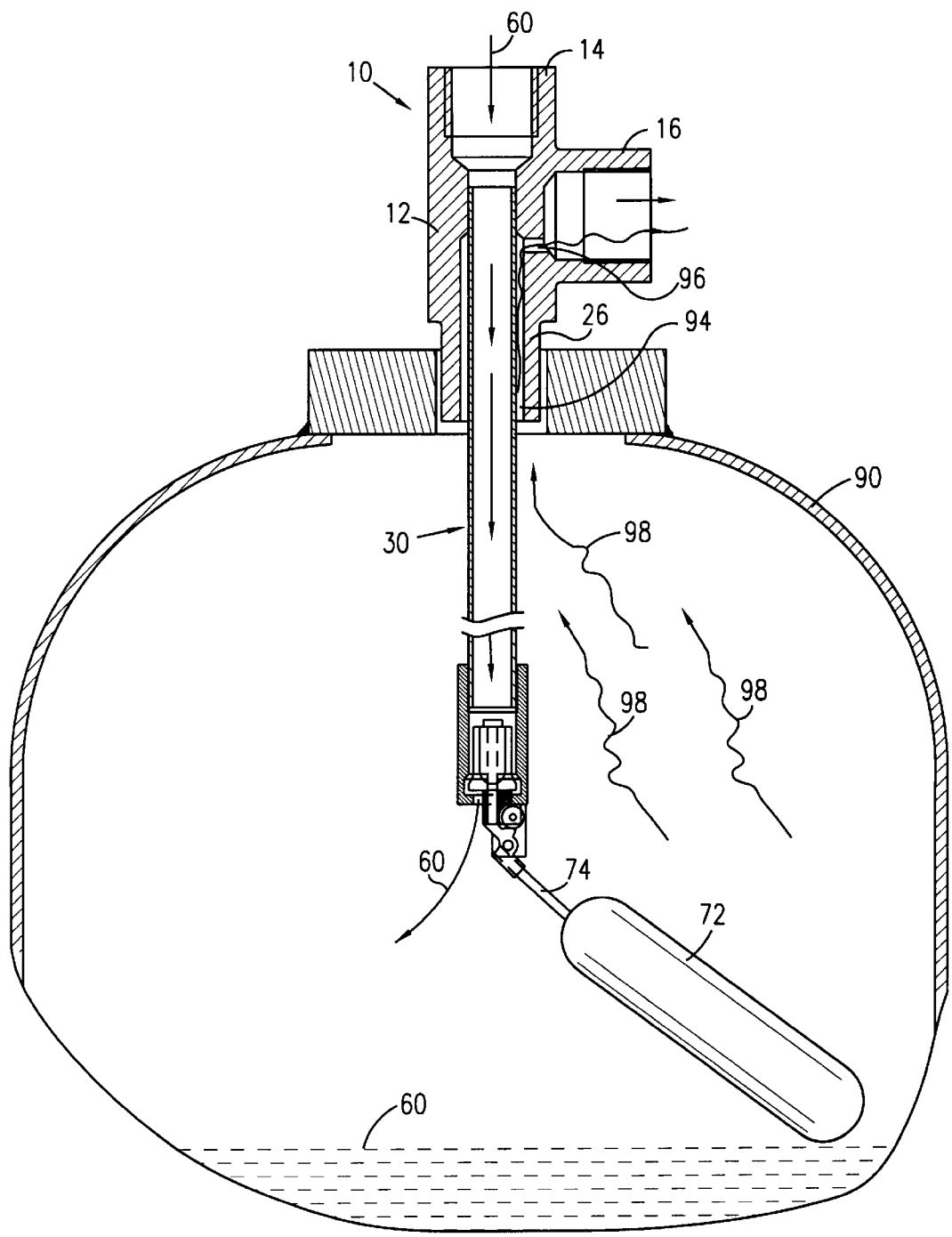
FIG. 4A is a simplified, partially sectional illustration of the filling, apparatus of FIG. 1 fixedly attached to a pressurized fluid container.

Reference is now made to FIG. 4A which illustrates filling apparatus 10 fixedly attached to pressurized fluid container. Pressurized fluid 60 may be introduced from a fluid source (not shown) and flow through first threaded branch 14 and pipe 30. Since float 72 is positioned at a generally obtuse angle with respect to pipe 30, pressurized fluid 60 is free to flow through aperture 62 into container 90.

Preferably a bypass passageway 94 is formed between pipe 30 and third threaded branch 26. Bypass passageway 94 is preferably in fluid communication with an orifice 96 formed in second threaded branch 16. It is a particular feature of the present invention that a fluid 98, such as LPG vapor, can be conducted through bypass passageway 94 even during filling of container 90. In this way, a consumer can constantly use fluid 98, such as for home cooking, without interruption, even during, filling, of container 90.

Figure 4B:
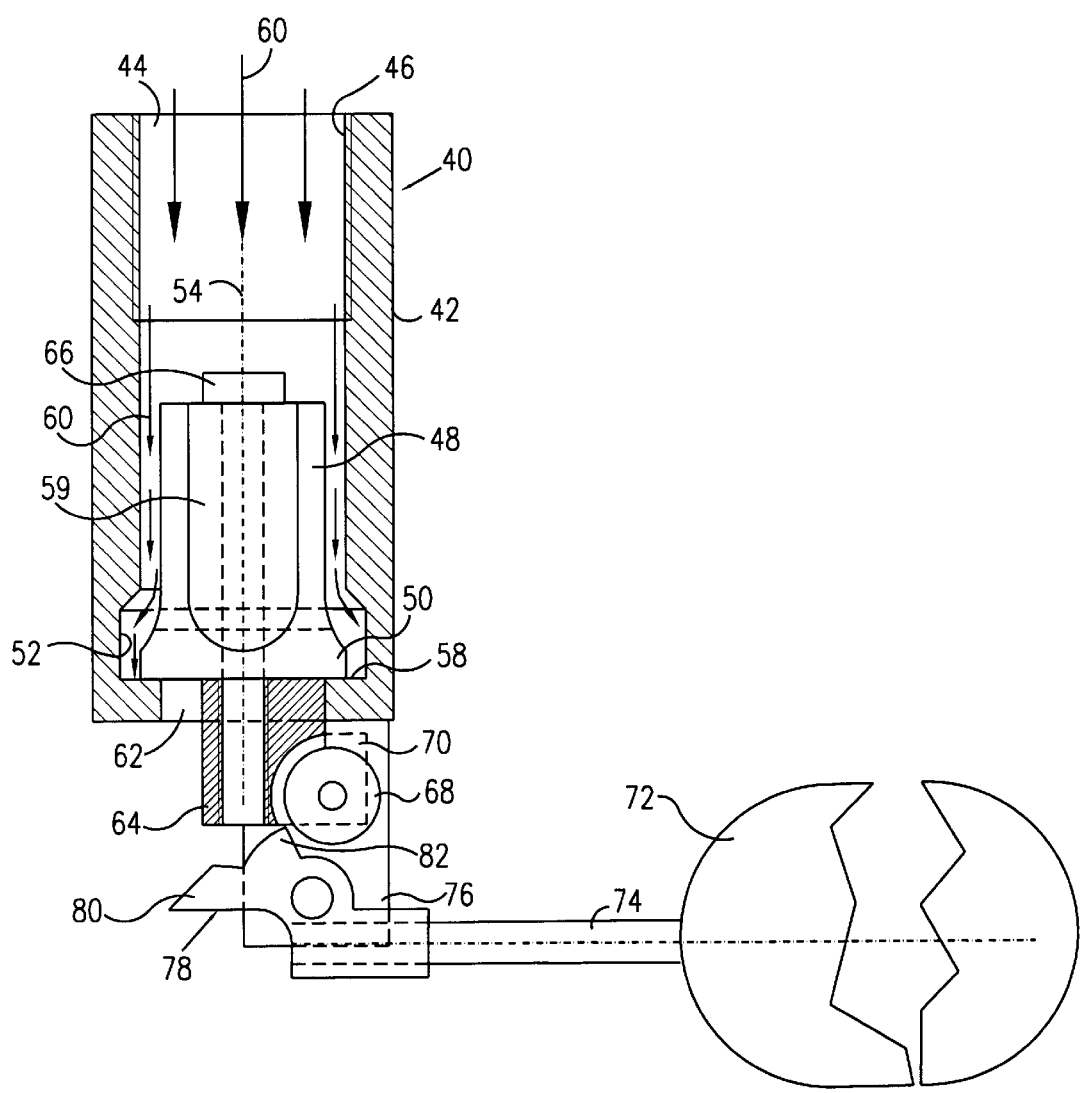
FIG. 4B is a simplified, partially sectional illustration of a float closing the valve of filling apparatus of FIG. 1, in accordance with a preferred embodiment of the present invention, thereby stopping filling of a pressurized fluid container.

Reference is now made to FIG. 4B which illustrates the position of filling apparatus 10 upon further filling of container 90 with pressurized fluid 60. For clarity of detail, container 90 is omitted in FIG. 4B. Upon sufficient filling, of container 90, float 72 is buoyed by fluid 60 and float arm 74 is approximately at 90° to axis 54. In this position, arcuate portion 82 has slid off roller 68 and flat end portion 80 has been rotated about 90° from interface member 64. The changed positions of arcuate portion 82 and flat end portion 80 permit enlarged end 50 of piston 48 to seat against end surface 58, thereby preventing pressurized fluid 60 from flowing through aperture 62 into container 90. Thus filling apparatus 10 automatically stops filling, container 90 without any need for fluid to escape to the environment to signal when to stop filling, container 90.

It is noted that the purpose of roller 68 is to provide a very low friction surface for arcuate portion 82 to move against. Alternatively, roller 68 may be replaced with a non-rolling, low friction surface.

Figure 5:
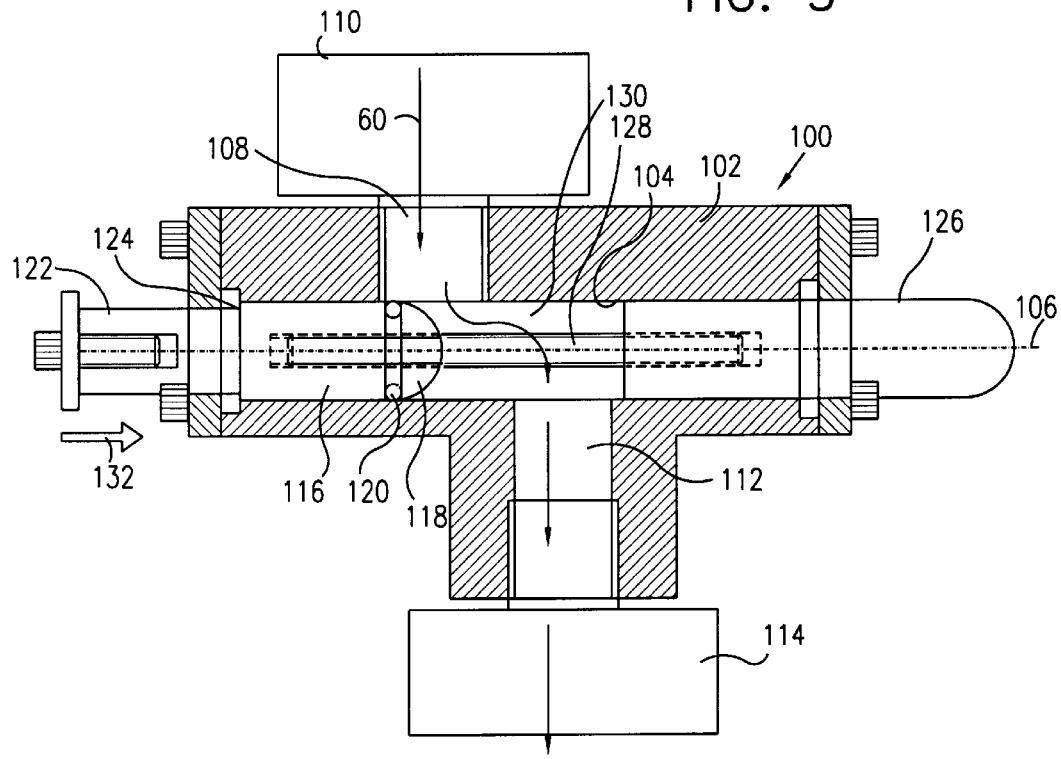
FIGS. 5 and 6 are simplified, partially sectional illustrations of a pressure valve, constructed and operative in accordance with a preferred embodiment of the present invention, respectively before and after substantially sealing filling apparatus of FIG 1.
Figure 6:
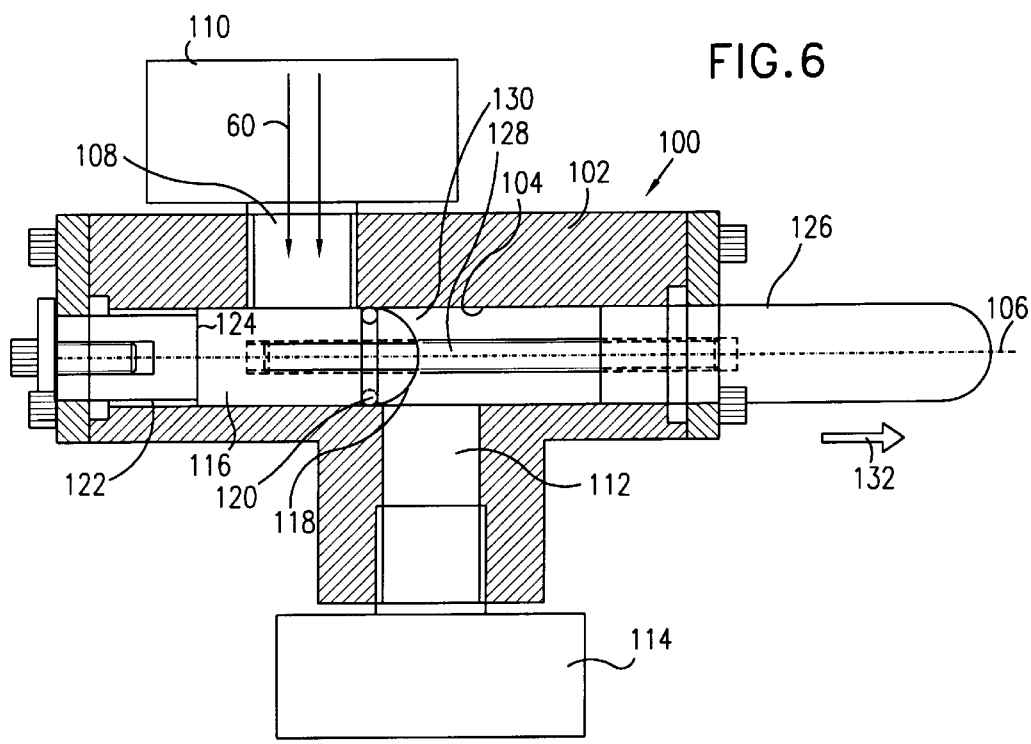

Reference is now made to FIGS. 5 and 6 which are simplified, partially sectional illustrations of a pressure valve 100, constructed and operative in accordance with a preferred embodiment of the present invention.

Pressure valve 100 preferably includes a body 102 which is formed with a bore 104 along a longitudinal axis 106, a transverse inlet bore 108 in fluid communication with an inlet coupling 110 and a transverse outlet bore 112 in fluid communication with an outlet coupling 114. Outlet coupling 114 is connectable to first threaded branch 14 (FIG. 1).

Slidingly disposed in bore 104 is a first piston 116 which includes a bulbous end 118 and an O-ring 120 proximal to bulbous end 118. Opposite to bulbous end 118, first piston 116 has a generally cylindrical extension 122 which has a smaller diameter than the rest of first piston 116. A shoulder 124 is formed at the junction of extension 122 to the rest of first piston 116. A second piston 126 is also slidingly disposed in bore 104 and is preferably connected to first piston 116 by a threaded pin 128, there being a gap 130 between the two pistons 116 and 126.

In the position shown in FIG. 5, pressurized fluid (50 may flow through inlet coupling 110, inlet bore 108, gap 130, outlet bore 112 and outlet coupling, 114 to first threaded branch 14 (FIG. 1). Second piston 126 preferably substantially hermetically seals any flow of pressurized fluid 60 from leaking, therethrough. However, in first piston 116, only extension 122 hermetically seals flow of pressurized fluid 60 from leaking, therethrough, whereas the rest of first piston does not seal flow of pressurized fluid 60 from leaking, therethrough. This is because O-ring 120, in the position of FIG. 5, is opposite inlet bore 108 and does not seat fluid flow towards the portion of bore 104 in which is disposed first piston 116. Thus fluid 60 is free to flow towards extension 122 and is constrained to apply fluid pressure against shoulder 124 in the direction of an arrow 132. As long as fluid 60 flows through gap 130, however, the fluid force on shoulder 124 does not cause first piston 116 to slide in bore 104 in the direction of arrow 132 because the area of shoulder 124 is smaller than the full area of bulbous end 118.

FIG. 6 illustrates the operation of pressure valve 100 when pressurized fluid 60 ceases to flow through gap 130, e.g., when container 90 is sufficiently filled. The remainder of fluid 60 continues to flow though inlet bore 108 and leaks through the space between first piston 116 and bore 104. Fluid 60 flows towards extension 122 and applies fluid pressure against shoulder 124 in the direction of arrow 132, thereby causing first piston 116 to slide in bore 104 in the direction of arrow 132. O-ring 120 then seals inlet bore 108 from outlet bore 112 so that no more fluid 60 flows to outlet bore 112.

It is a particular feature of the present invention that enlarged end 50 of piston 48 preferably does not hermetically seal flow of fluid 60 when in the position shown in FIG. 4B. Rather a small amount of fluid is purposely allowed to leak into container 90. The reason is that after pressure valve 100 has substantially blocked flow to pipe 30 and a user has removed pressure valve 100 from filling apparatus 10, a column of pressurized fluid 60 remains in pipe 30. If there were no leakage into container 90 via enlarged end 50, pressurized fluid 60 remaining in pipe 30 could possibly cause rupture of pipe 30, such as during temperature changes. The small leakage at enlarged end 50 ensures that no damage will occur due to pressure build-up and temperature change.

Figure 7A:
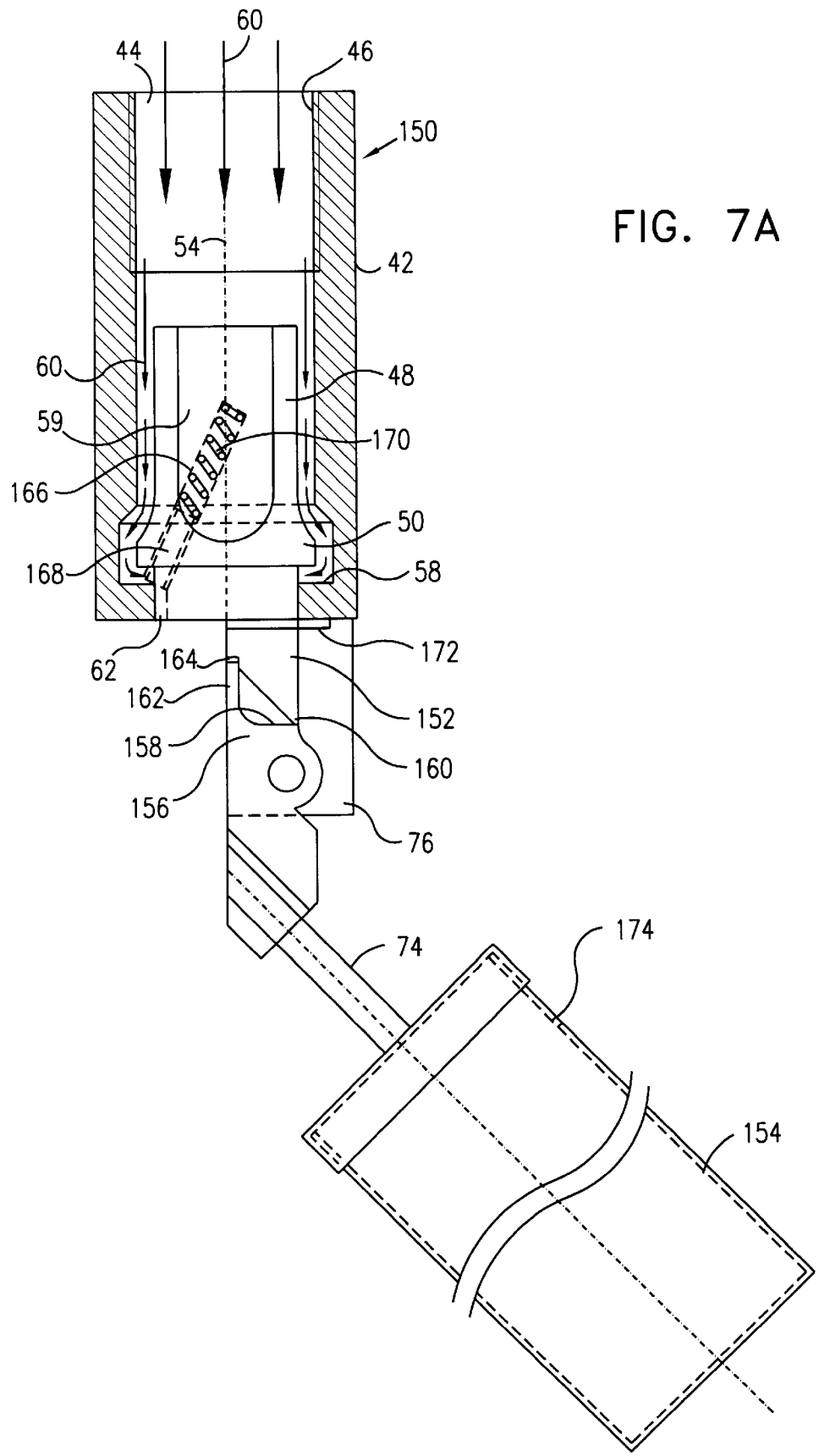
FIG. 7A and 7B are simplified, partially sectional illustrations of another valve useful with the filling apparatus of FIG. 1, constructed and operative in accordance with another preferred embodiment of the present invention, respectively in an open position and in a closed position.
Figure 7B:
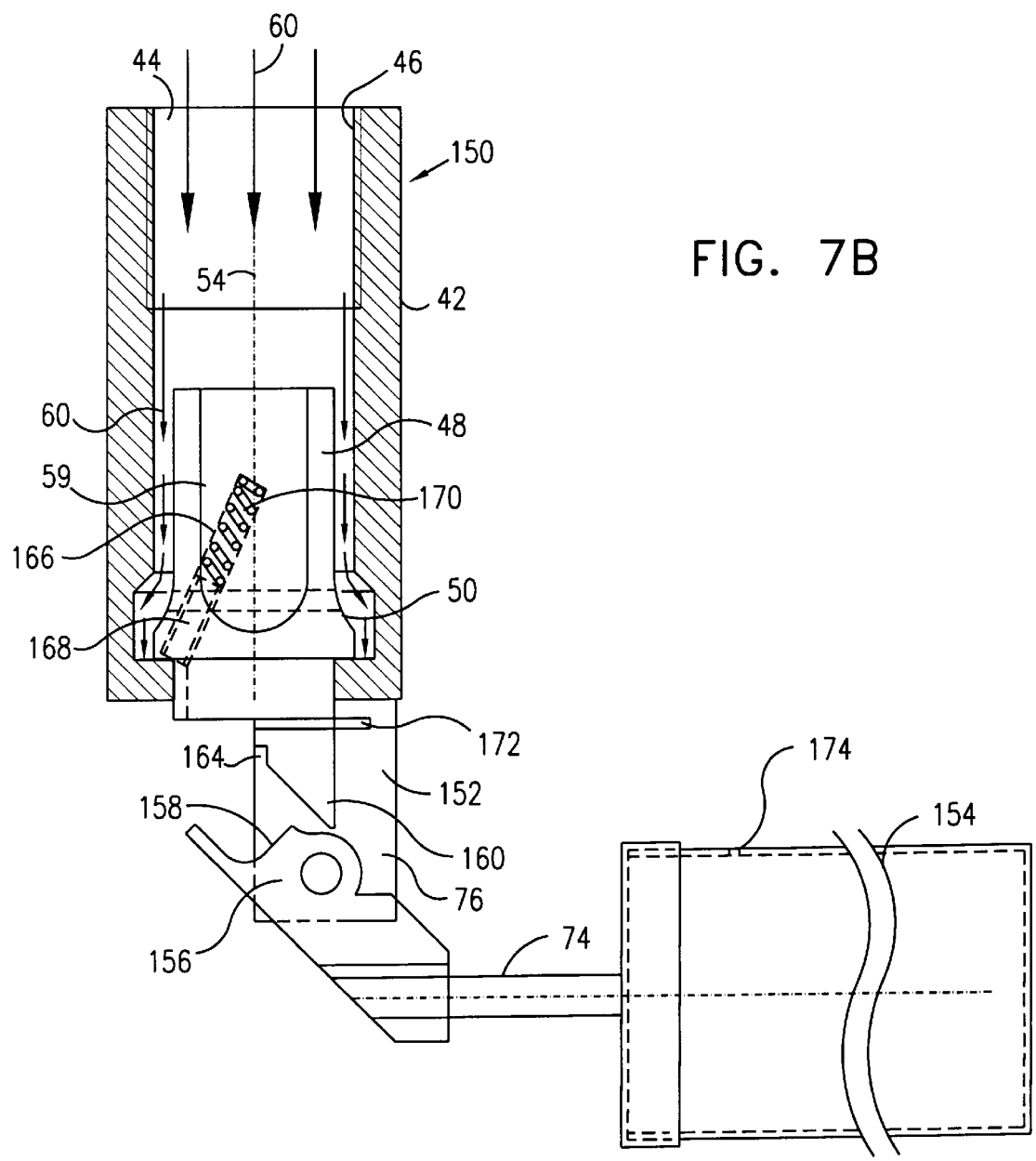

Reference is now made to FIGS. 7A and 7B which illustrate another valve 150 usefull with filling apparatus 10, constructed and operative in accordance with another preferred embodiment of the present invention. Valve 150 is similarly constructed to valve 40, with like numerals designating like elements. Valve 150 differs from valve 40 in that instead of interface member 64 extending from enlarged end 50 of piston 48 (as described previously with reference to FIG. 2), an interface member 152 protrudes through aperture 62 formed in tube 42. Interface member 152 may be constructed integrally as one piece with piston 48, or alternatively may be attached to piston 48 by means of a screw (not shown).

A float 154 is mounted on float arm 74 which, as mentioned above, is pivotally attached to block 76 fixedly attached to tube 42. An end 156 of float arm 74 has a generally, flat end portion 158 which initially abuts against a bottom portion 160 of interface member 152. End 156 also preferably includes a tongue 162 which is adapted to fit in or abut against a groove 164 formed in interface member 152. It is noted that preferably tongue 102 does not abut against the upper bounds of groove 164.

In the embodiment of FIGS. 7A and 7B, a slanted bore 166 is formed in piston 48, extending from enlarged end 50 into non-enlarged portion 59. A pin 168 is disposed in bore 166 and biased therein by a biasing device such as a spring 170.

In the position of FIG. 7A (as similarly described above with reference to FIG. 2), enlarged end 50 of piston 48 does not initially rest against is free to flow through aperture 62 into a pressurized container (not shown in FIG. 7A). A stopper pin 172 may be attached to interface member 152 to limit the upward travel (in the sense of FIG. 7A) of piston 48. Pin 168 merely rests on an edge of surface 58 and does not interfere with the flow of fluid 60.

Reference is now made to FIG. 7B which illustrates the position of filling apparatus 10 upon further filling of container 90 (FIG. 3) with pressurized fluid 60. For clarity of detail, container 90 is omitted in FIG. 7B. Upon sufficient filling of container 90, float 154 is buoyed by fluid 60 and float arm 74 is approximately at 90° to axis 54. In this position, flat end portion 158 has slid off bottom portion 160 and has been rotated about 90° from interface member 152. The changed position of flat end portion 158 permits enlarged end 50 of piston 48 to seat against end surface 58, thereby preventing pressurized fluid 60 from flowing, through aperture 62 into container 90. Thus, by means of valve 150, filling, apparatus 10 automatically stops filling container 90 without any need for fluid to escape to the environment to signal when to stop filling container 90.

The purpose of spring 170 is now explained. First threaded branch 14 (FIG. 1) is connected to a one-way valve (not shown), referred to commonly in the art as an "Acme valve", or the pressure valve 100 described hereinabove with reference to FIGS. 5 and 6. Once pressurized fluid 60 stops flowing through aperture 62 into container 90, the fuel deliverer disconnects the fuel delivery equipment (not shown) from container 90, and the one-wave valve substantially prevents any leakage of fluid 60 to the environment. As long as there is a predetermined amount of pressurized fluid 60 still present in tube 42 of valve 150, this amount of fluid is sufficient to overcome the force of spring 170 and seat piston 48 against surface 58. As mentioned above, enlarged end 50 of piston 48 preferably does not hermetically seal flow of fluid 60 when in the position shown in FIG. 7B but rather a small amount of fluid is purposely allowed to leak into container 90, After this remaining fluid flows into container 90, and there is less than the predetermined amount of pressurized fluid 60 present in tube 42, sprint, 170 then urges piston 48 away from surface 58, and the container 90 is ready for use by a consumer. As the consumer draws fluid from container 90, float 154 gradually swings back to the position shown in FIG. 7A. Since spring 170 has already urged piston 48 away from surface 58, float 154 has virtually no obstruction in its swinging travel.

Float 154 is preferably constructed of a sturdy and light material, such as a very thin wall aluminum alloy. In order to prevent mechanical rupture of the thin wall, a needle hole 174 is preferably formed in the wall of float 154, this hole being, sufficiently small such that only vapors and not liquid can enter float 154. The presence of hole 174 causes equalization of vapor pressure within float 154 and outside float 154 in container 90. Thus float 154 is still buoyed by fluid 60 inside container 90 and hole 174 serves as a vent to prevent rupture of the float.

It will be appreciated by persons skilled in the art that the present invention is not limited by what has been particularly shown and described hereinabove. Rather the scope of the present invention includes both combinations and sub-combinations of the features described hereinabove as well as modifications and variations thereof which would occur to a person of skill in the art upon reading the foregoing description and which are not in the prior art.

What is claimed is:

1. Pressurized fluid apparatus comprising:

a pressurized fluid container;

a pipe arranged for flow therethrough of a pressurized fluid into said container;

a valve mechanism operatively connected to an end of said pipe disposed in said container;

a branch influid communiation with said fluid container adapted for flow therethrough of fluid from said fluid container for consumer use; and said mechanism having a float attached to a valve, wherein said float is buoyed generally upwards by said pressurized fluid filling said container, such that when said float has been moved a predetermined amount, said float closes said valve and substantially stops flow of said pressurized fluid into said container, and wherein said valve mechanism, said branch and said pipe are insertable through an upper opening of said container as a single unit, and wherein said valve mechanism is rotatably attached to said pipe, said valve being closed by an angular upward movement of said float;

characterized by said valve comprising:
- a tube with a longitudinal bore having a longitudinal axis formed therein, and
- said valve including a piston slidingly disposed in said tube, wherein only when said float is generally perpendicular to said longitudinal axis, said piston sealingly abuts an internal end face of said tube, thereby closing said valve;

said pressurized fluid apparatus further comprising:
- a bypass passageway extending along and around at least a portion of said pipe in fluid communication with said branch for conducting therethrough fluid to said branch for consumer use, even during filling of said container through said pipe.

2. Pressurized fluid apparatus according to claim 1 wherein said piston has an enlarged end and said bore has an enlarged portion to accommodate and receive therein said enlarged end, and wherein movement of said enlarged end along said longitudinal axis of said tube is constrained between a shoulder and an end surface of said enlarged portion of said bore.

3. Pressurized fluid apparatus according to claim 1 and wherein an interface member extends from said piston and protrudes through an aperture formed in said tube, and said float is mounted on a float arm, and wherein an end of said float arm has a generally flat end portion which initially abuts against said interface member and a generally arcuate portion which initially contacts a low-friction portion of said interface member, and wherein said piston sealingly abuts said internal end face of said tube only when said arcuate portion slides off said low-friction portion.

4. Pressurized fluid apparatus according to claim 1 and wherein an interface member extends from said piston and protrudes through an aperture formed in said tube, and said float is mounted on a float arm, and wherein an end of said float arm has a generally flat end portion which initially abuts against said interface member and a generally arcuate portion which initially contacts a low-friction portion of said interface member, and wherein said piston sealingly abuts said internal end face of said tube only when said flat end portion is rotated about 90° from said interface member.

5. Pressurized fluid apparatus according to claim 1 and wherein said piston is shaped to ensure laminar flow of a pressurized fluid therearound.

6. Pressurized fluid apparatus according to claim 1 and wherein said valve when closed is not hermetically closed.

7. Pressurized fluid apparatus according to claim 1 and wherein a biasing device imparts a biasing force on said piston, said biasing force being of a magnitude such that if said tube contains a predetermined amount of said pressurized fluid then predetermined amount is sufficient to overcome the biasing force and seat said piston against said internal end face, and that if said tube contains less than the predetermined amount, said biasing device urges said piston away from said internal end face of said tube.

8. Pressurized fluid apparatus according to claim 7 and wherein said biasing device is disposed in a bore formed in said piston.

9. Pressurized fluid apparatus according to claim 1 and wherein a needle hole is formed in a wall of said float, said hole being sufficiently small such that generally only vapors of said pressurized fluid and not liquid of said pressurized fluid can enter said float.

* * * * *